April 28, 1953     A. THOMAS     2,636,675
STATISTICAL MACHINE

Filed May 23, 1952                                         6 Sheets-Sheet 1

Inventor.
Arthur Thomas,
By
Attorney

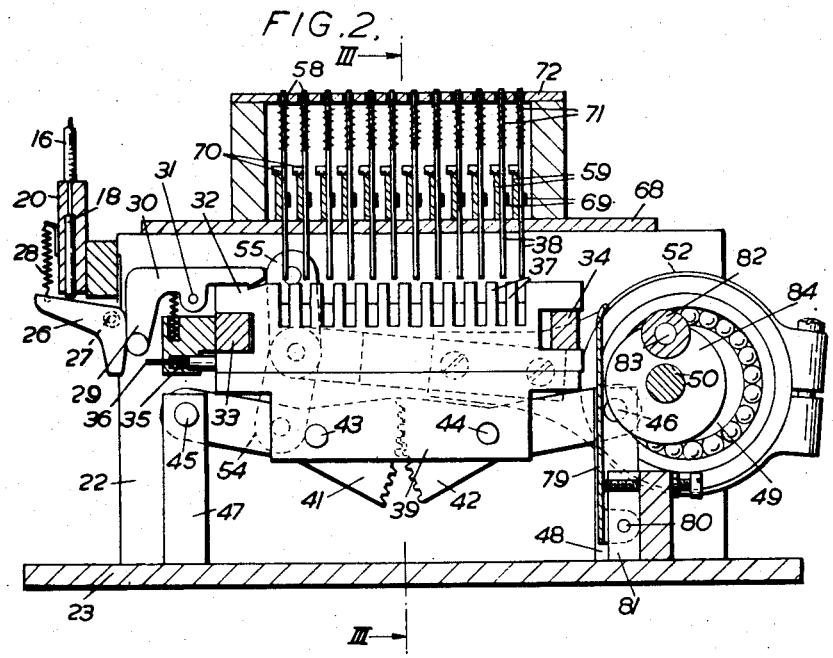
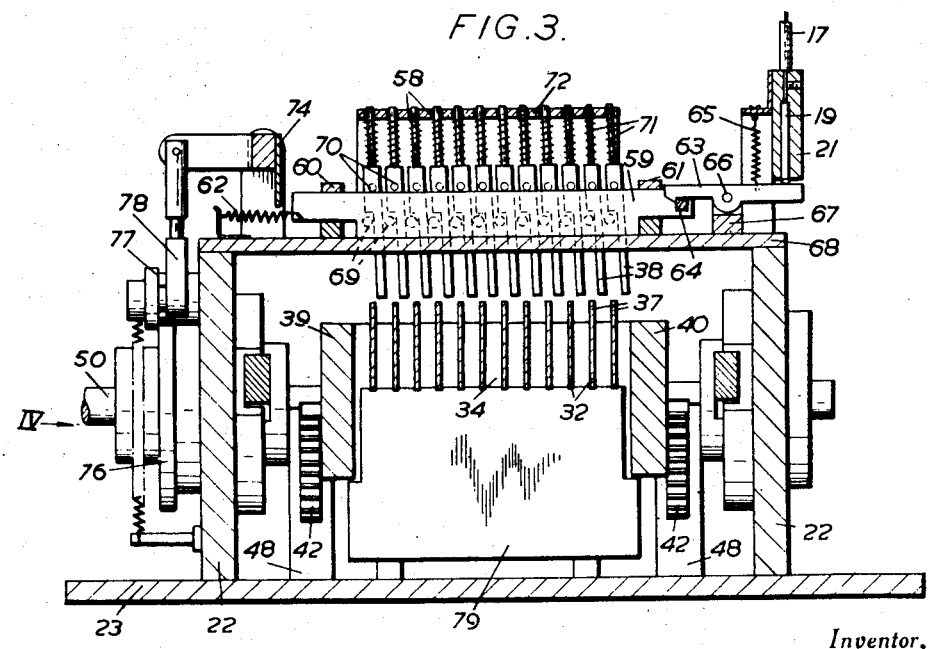

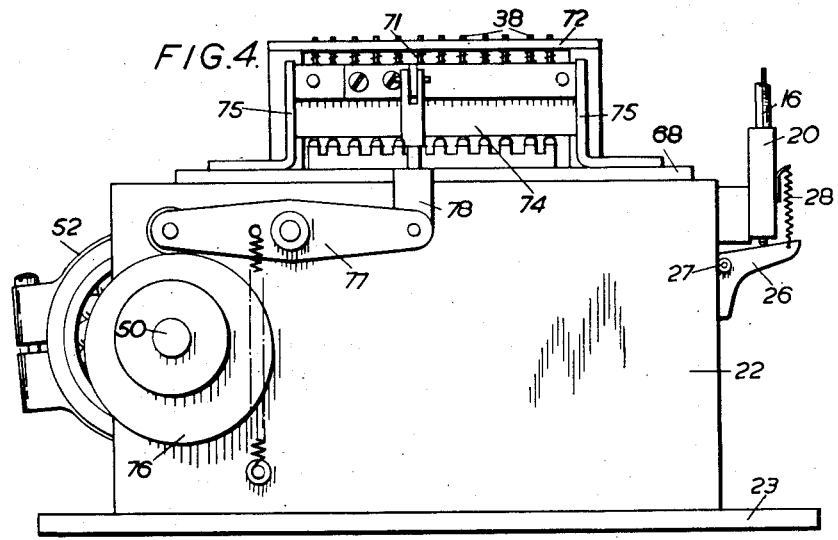
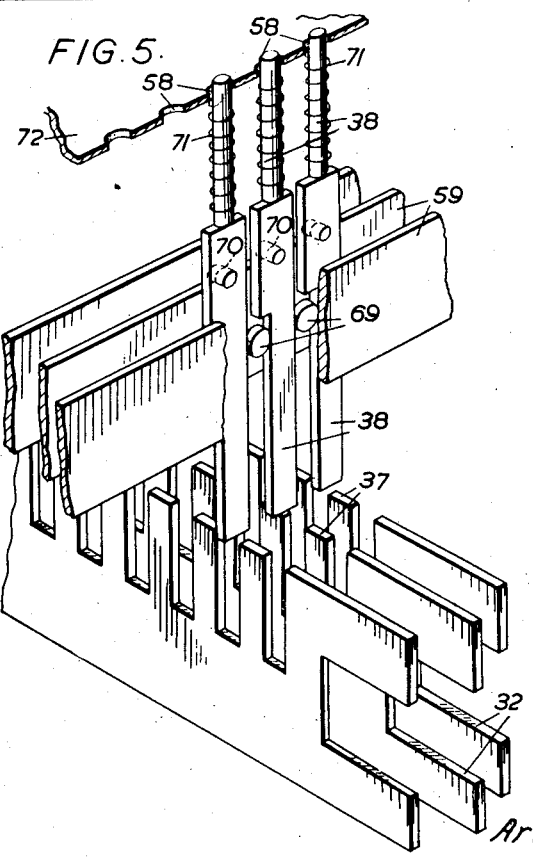

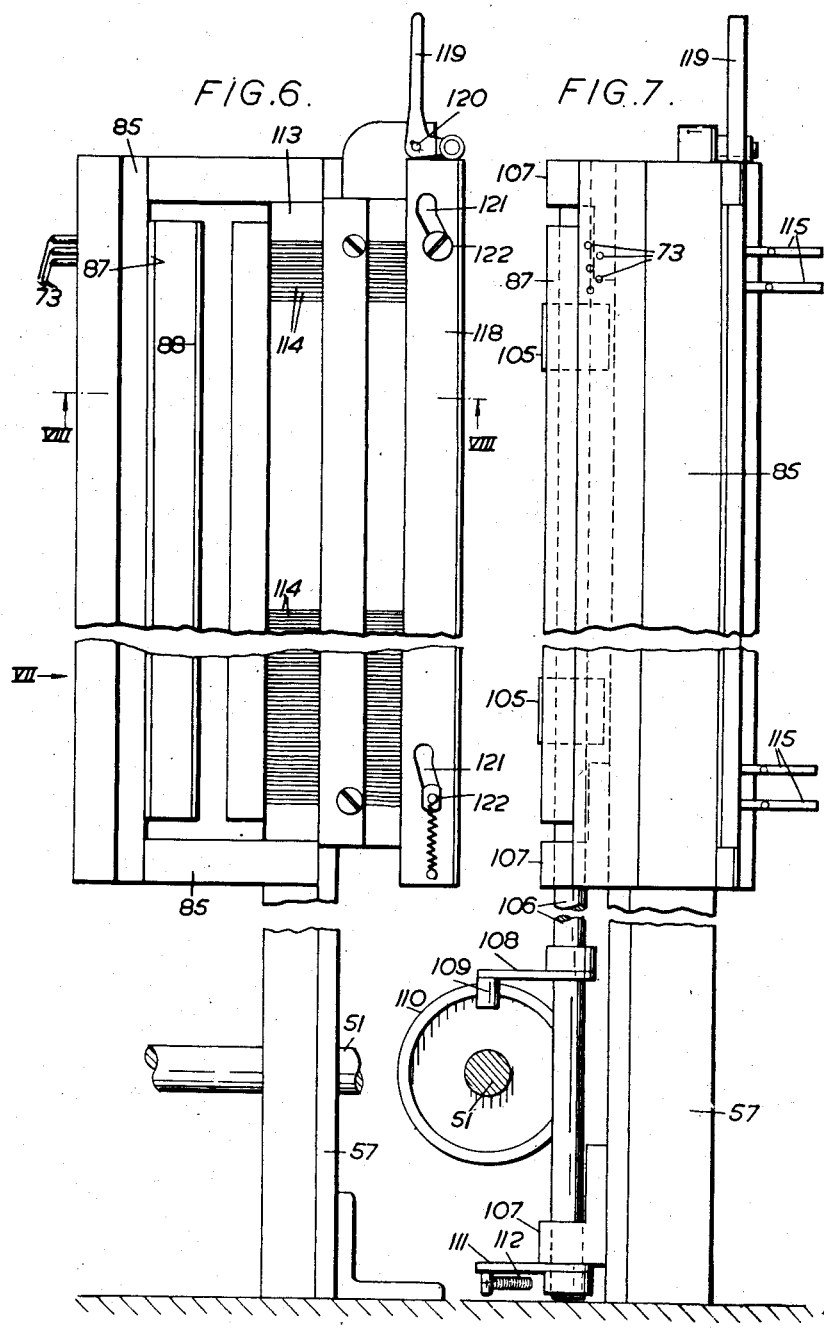

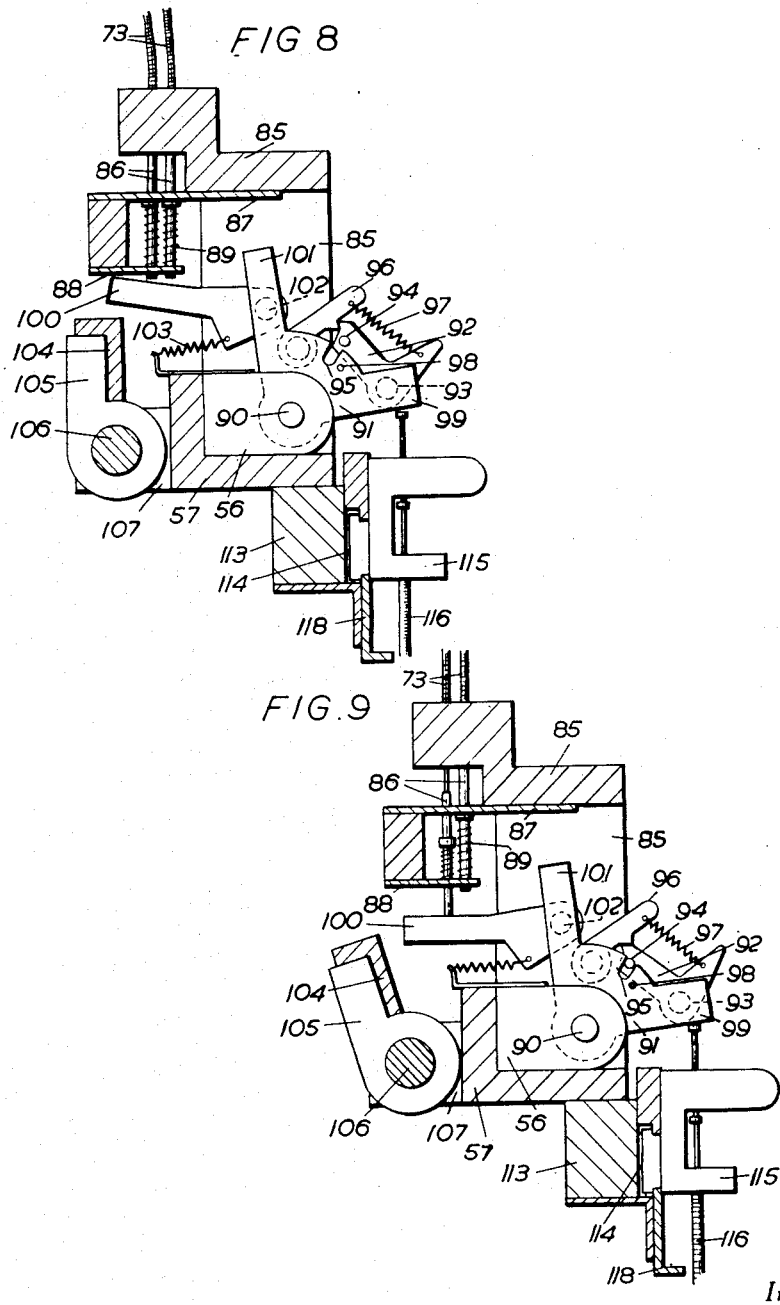

April 28, 1953

A. THOMAS 2,636,675

STATISTICAL MACHINE

Filed May 23, 1952

6 Sheets-Sheet 6

Inventor·
Arthur Thomas,
By
Attorney

Patented Apr. 28, 1953

2,636,675

UNITED STATES PATENT OFFICE 2,636,675

STATISTICAL MACHINE

Arthur Thomas, Wallington, England, assignor to Powers-Samas Accounting Machines Limited, London, England, a British company Application May 23, 1952, Serial No. 289,601
In Great Britain June 15, 1951

9 Claims. (Cl. 235—61.6)

This invention relates to statistical machines controlled by record cards.

It is a main object of the present invention to provide, for use with a statistical machine controlled by record cards, for example, a machine for counting, sorting, and printing, a device for providing impulses representative of numbers derived from the sensing, from two columns of a record card, of data representative of figures.

For providing impulses representative of numbers derived from the sensing from two columns of a record card data representative of figures, there is provided according to the invention a device operable under the control of statistical record cards and comprising a group of independently lengthwise movable toothed slides, a group of independently lengthwise movable selector slides, means to support the groups of slides in superposed relation for lengthwise sliding movement in directions normal one to the other, impulse imparting elements movable by the selector slides from inactive to active positions for lengthwise movement by teeth on the toothed slides a column of actuators for each group of slides, one actuator being provided for each slide and the actuators of each column being appropriated one to each data-indicating position in a single column of a record card, and a reciprocable carriage for the toothed slides to move the toothed slides towards the impulse imparting elements thereby to effect lengthwise movement of active ones thereof.

Figure 1:
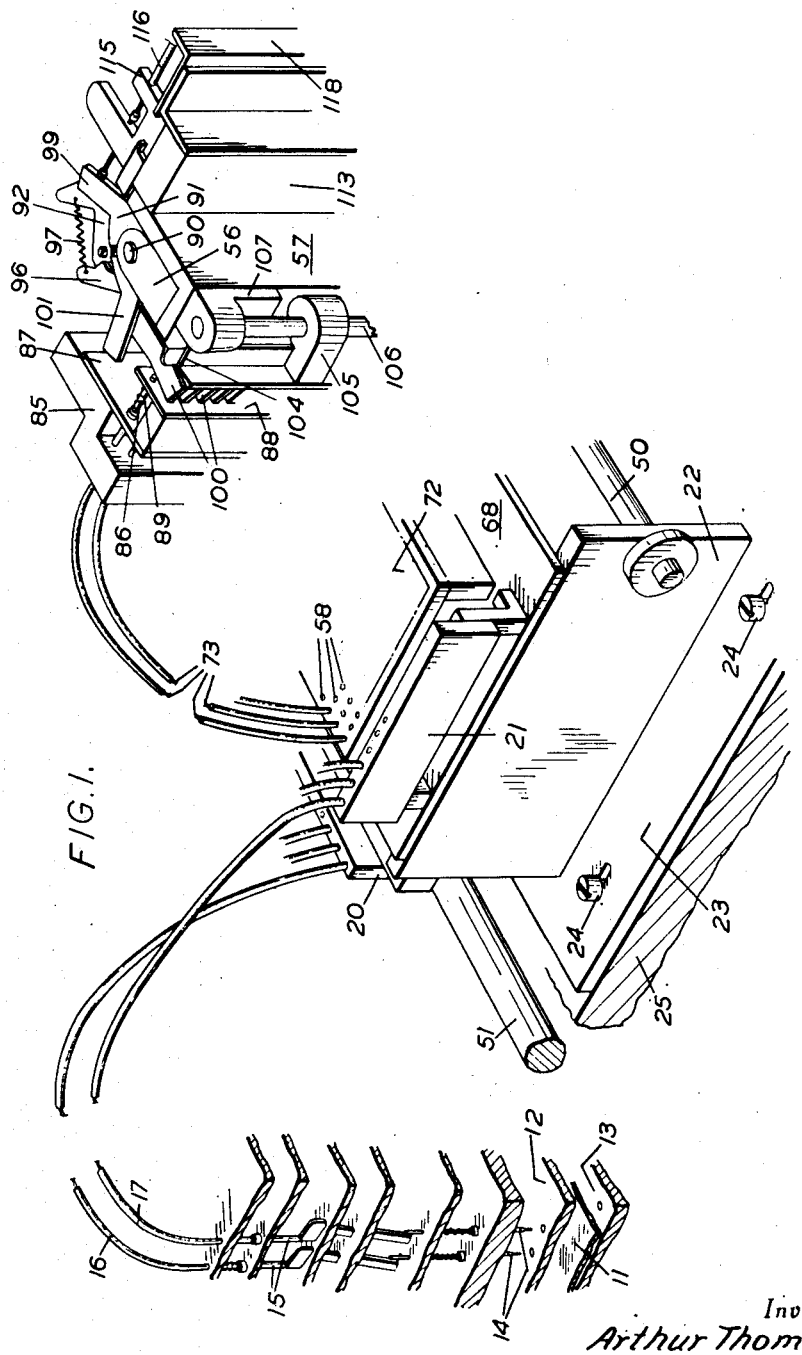
Figure 10:
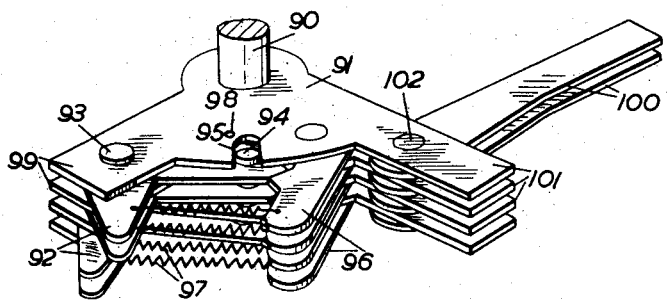
Figure 11:
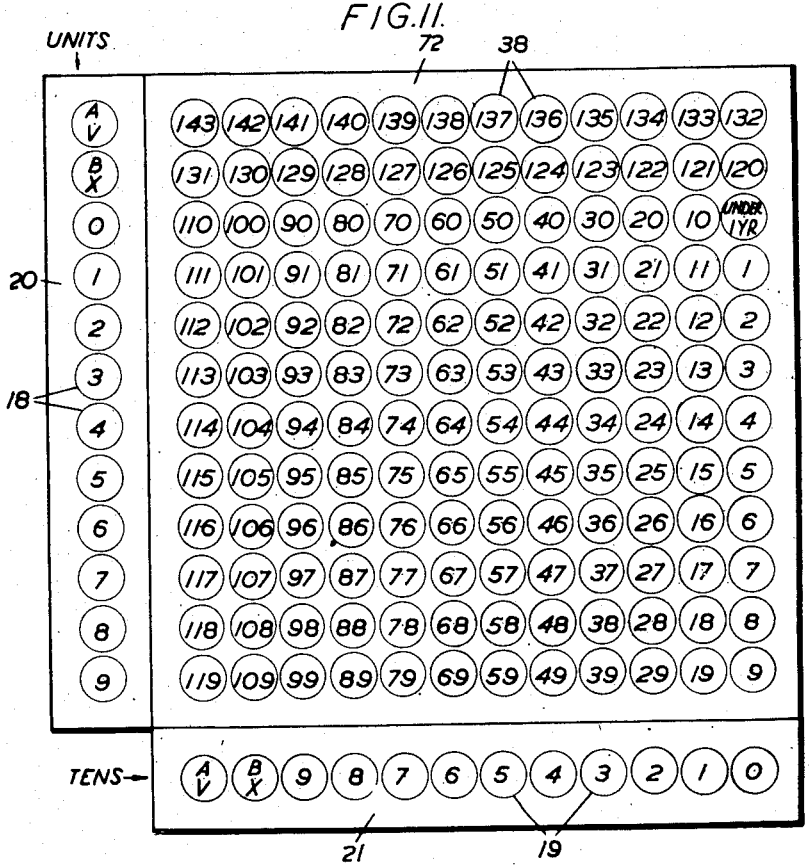

In order that the invention may be clearly understood, an embodiment thereof will now be described, by way of example, with reference to the accompanying diagrammatic drawings in which:

Fig. 1 is a diagrammatic perspective view of a device according to the invention, Fig. 2 is a section through a part of the apparatus shown in Fig. 1, Fig. 3 is a section on line III—III, Fig. 2, Fig. 4 is a side view looking in direction of arrow IV, Fig. 3, and shows the operation of a restoring plate, Fig. 5 is a perspective view illustrating the manner of operation of toothed and selector slides, Fig. 6 is a broken side elevation of a distributor unit, from which some parts are omitted for clarity, Fig. 7 is an elevation looking in the direction of arrow VII, Fig. 6, Fig. 8 is a section, to an enlarged scale, on the line VIII—VIII, Fig. 6, Fig. 9 is a view similar to that shown in Fig. 8 with some of the parts shown in different positions, Fig. 10 is a perspective view showing the manner of connecting and disconnecting certain elements of the distributor unit, and Fig. 11 is a diagram indicating the numbers represented by the impulse imparting members illustrated in Figs. 1 to 3.

Like reference numerals refer to similar parts throughout the various figures of the drawings.

Referring to the drawings, the apparatus shown therein is assumed to be for use with a known form of machine which, under the control of perforating statistical record cards, effects operations of counting, sorting, and printing. As shown diagrammatically in Figure 1, a record card 11 is fed from a magazine, not shown, in known manner into a sensing chamber comprising an upper plate 12 and a lower plate 13 provided, in known manner, with perforations through which pass sensing pins 14. The sensing mechanism is of the kind in which the sensing chamber is reciprocated towards and away from the sensing pins 14 and the operation of the sensing apparatus diagrammatically shown in Figure 1 is well known in the art. When a sensing pin 14 passes through a perforation in a card, a transmission pin 15 is actuated and in turn operates a Bowden wire. The device according to the present invention is arranged to be controlled through perforations contained in two vertical columns of a record card and, accordingly, there are provided two sets of Bowden wires 16, 17 each set comprising one wire corresponding to each data indicating position in a card column. Thus, in the present instance, where each card column comprises twelve data indicating positions each of the groups of Bowden wires contains twelve wires. The wires are connected with actuators formed by axially movable pins 18, 19, Figs. 2 and 3, housed in blocks 20, 21 secured to a frame 22 supported by a plate 23 which, in turn, is secured by screws 24, Figure 1, to the body 25 of a machine. A pin 18, on axial movement of its co-operating Bowden wire 16, rocks a bell crank 26 about its pivot 27 and against the action of a spring 28 so that the tail 29 of a latch 30 is engaged thereby in a manner such that the latch is rotated anti-clockwise, as viewed in Figure 2, about its pivot 31, thus releasing a toothed slide 32 supported by bars 33, 34 so that, on release by the latch 30, the slide 32 can be moved lengthwise by a spring 35, embracing a pin 36 extending from an end of the slide 32.

A slide 32 is provided for each of the twelve actuators 18 and each slide 32 is formed as a comb having a plurality of teeth 37 which, when the slide 32 is moved to the right, as viewed in Figure 2, under the action of its spring 35, are positioned beneath the lower ends of impulse imparting elements 38.

The bars 33, 34 are fixed to plates 39, 40, Fig. 3, to form a box or frame which is reciprocated vertically by meshed toothed quadrants 41, 42, the gradrants being mounted on pins 43, 44 supported by the plates 39, 40. The meshed quadrants provide a parallel motion by which the unit is maintained in a horizontal position while in motion. Each quadrant is provided with a tail and the tails are pivotally mounted on pins 45, 46 carried by members 47, 48 mounted on the plate 23. The slides 32, supported by the bars 33, 34 and plates 39, 40, forming a carriage therefor are reciprocated by a toggle mechanism including links 54, 55 operated by eccentric rods 52 from eccentrics 49 mounted on a shaft 50 which is rotated in timed relation with the operation of the sensing device by a chain and sprocket, not shown, operated from a driving shaft 51, Figs. 1, 6 and 7.

Above the group of toothed slides 32 there is disposed a group of selector slides 59, the slides 59 being slidable lengthwise in blocks 60, 61, Figure 3, one slide 59 being provided for each of the actuators 19. The slides 59 are movable lengthwise under the influence of springs 62, but are normally retained inactive by latches 63 which engage over lateral abutments 64 on the slides 59. The latches 63 are retained in latching engagement with the abutments 64 by springs 65 and are pivoted at 66 to comb members 67 mounted on a plate 68 which also supports the blocks 60, 61.

The slides 59 are each provided with guide elements formed as short pins 69 extending laterally thereof, the impulse imparting members 38 being disposed between the guide elements 69 for lengthwise movement under control of the toothed slides 32. Each of the impulse imparting elements 38 is formed as a pin of circular cross-section at its upper end, this portion being guided freely in a hole 58 in a plate 72, the hole providing sufficient freedom to allow the lower end of the element 38 to swing by the required amount so as to be operative as described below. Each element 38 has a laterally extending pin 70 which rests on the upper edge of a selector slide. When a slide 59 is released by its latch 63, each of the impulse imparting elements 38 associated therewith is rocked by movement of the guide elements 69 so that the lower ends of the impulse imparting elements comprising that column are aligned with the toothed slides 32 of the lower group, as is illustrated in Figure 5. The impulse imparting members are urged towards the slides 32 by springs 71.

When a card is sensed, a sensing pin 14 in each of the two appropriate columns senses a hole and operates the appropriate one of the groups 16, 17 of Bowden wires so that in each of the blocks 20 and 21 one of the actuators 18 and 19 is operated to release its associated latch 30, 63, thus permitting in each of the groups lengthwise movement of one only of the slides 32, 59. Accordingly, all the impulse imparting elements 38 for one column will be aligned with the slides 32 but, since only one of the slides 32 has been moved lengthwise, when the eccentric 49 operates to raise the slides 32 towards the elements 38, only one of the elements will be moved lengthwise against the action of its springs 71, because only one of such elements will be aligned with a tooth 37, see Fig. 5.

Supported in close proximity with each of the impulse imparting elements is a Bowden wire 73 forming transmission means for impulses imparted by the elements 38 and, on upward movement of one of the elements 38, the Bowden wire co-operating therewith is operated thereby to transmit an impulse for effecting an operation to be described below. When the slides 32 have been restored to their lower position by the eccentric 49, the actuating member 59 which has been operated is restored to its latched position by a restoring bar 74 pivoted in brackets 75 and rocked by a cam 76 on shaft 50, Figure 4, through levers 77 and 78, Figure 4. The operated slide 32 is restored by a restoring plate 79, Figure 2, pivoted at 80, in a bracket 81, the restoring plate 79 being engaged by a roller 82 supported by a pin 83 secured to a disc 84 rotatable with the shaft 50. The roller 82 operates the restoring plate 79 against the action of a spring, not shown.

The apparatus being described is, as stated above, adapted for attachment to statistical machines for counting, sorting, and printing such as can be used for collating information relative to a census. One of the items of information which it is desired to obtain during the taking of a census is the number of people whose ages fall within pre-determined groups, for example it may be desired to know the number of people whose ages range from less than one year to seven years, from eight to seventeen and so on. The device according to the present invention is so constructed as to permit this information to be obtained by adding one to a selected one of a plurality of counting elements, not shown, in the usual manner each time there is sensed in a card an age falling within a predetermined group.

From Figure 11 it will be observed that the actuators 18 represent numbers sensed from a column considered to be a units column in a record card and the actuators 19 represent numbers sensed from a column of a record card considered to represent tens. Thus, if in a particular card the age of a child is under one year, in both the units and tens columns of the card a naught will be punched so that, after sensing, the toothed end selector slides have been moved so that the impulse imparting element representative of under one year is moved axially to impart an impulse to the number imparting Bowden wire 73. As a further example, let it be assumed, that the age recorded in a record card is 73, then in the units column of the card there is punched a three and in the tens column there is punched a seven. From Figure 11 it will be observed that the impulse imparting member which is actuated is that representative of the number 73. It may be that the age is in excess of 99, in which event the A and B data-indicating positions of a record card for the units and tens columns are given appropriate values so that when these positions are sensed in combination with each other or with other positions, results are obtained as shown in Figure 11. For example, if in the units column a hole is sensed in the A position and in the tens column in the Sevens position, the impulse imparting member representative of the number 139 will be actuated.

As mentioned above, the unit according to the invention for imparting impulses representative of numbers co-operates with a device which will impart to a selected single counter individual impulses received from a group of impulse imparting elements 38. This device is illustrated in Figures 6 to 10 and comprises an upright support 57, this support carrying a frame 85 which is arranged to retain the outer ends of the Bowden wires 73 in alignment with a plurality of pins 86 supported for axial movement in plates 87, 88, the pins 86 being urged by springs 89 towards the Bowden wires 73.

The upright support 57 is an angle supporting a number of comb bearings 56, Figs. 1, 8 and 9, and spindles 90 about which a number of bell cranks 91, one for each of the pins 86, are mounted for free angular movement. The bell cranks are flat elements separated one from the other by connecting members 92 pivoted on pins 93 extending from the upper faces of the bell cranks 91. Each connecting member 92 has a pin 94 extending therefrom for engagement in a slot 95 formed in the bell crank 91 next above the connecting member 92. The connecting member 92 is connected with a latch 96 by a spring 97, the latch being arranged to retain the connecting member 92 in a position as shown in Figure 8, so that the pin 94 carried thereby is out of engagement with the slot 95 in the bell crank 91 next above the connecting member 92. When, however, a bell crank 91 is to be connected with the bell crank next below it, the connecting member 92 between the two bell cranks is disengaged from its latch 96 so that the pin 94 is engaged in the slot 95 of the upper of the two bell cranks. The connecting member 92 is arrested in its inner position by a stop pin 93 Figure 9. As can be seen from Figure 8, when a connecting member 92 is moved to its outer position, the arm 99 of the bell crank 91 next above the connecting member can move over the pin 93 and the pin 94 is, in its outer position, moved relative to the slot so as to be completely out of engagement therewith and not to obstruct the angular movement of the bell crank 91 about the spindle 90. It will be understood that by this arrangement a number of bell cranks 91 can be connected together for simultaneous movement and the stack of bell cranks can be divided into groups as desired by appropriately moving the connecting members 92 to their inactive position as shown in Figure 8. The stack of bell cranks 91 is therefore divided into a plurality of groups, each of which will be moved angularly about the spindle 90 on operation of any one of a number of interponents shown as tail pieces 100 of which one is connected to the arm 101 of each of the bell cranks 91 by a pivot pin 102 depending from the underside of the arm 101. Each tail piece 100 is disposed for operation by one only of the pins 86 and is urged towards these pins by a spring 103.

For moving the bell cranks 91 angularly about their spindle 90 there is provided an impulse generator shown as an operating bar 104 which is common to all of the tail pieces 100 and is supported by top and bottom brackets 105 secured to a spindle 106 angularly movable in bearings 107 secured to the upright member 57. The spindle 106 has secured thereto an arm 108, Fig. 7, carrying a cam roller 109 which engages with a cam 110 for rotation with the shaft 51 so that the operating member 104 is operated in timed relation with the eccentrics 49. A second arm 111 secured to the spindle 106 carries a spring post on which is mounted a spring 112 to maintain the roller 109 in engagement with the cam 110.

Also secured to the upright member 57 is a block 113 in which are formed grooves 114, Figure 6, one for each of the bell cranks 91 and in which can be located one of a plurality of Bowden wire supporting elements 115, these elements supporting impulse transmitting means formed by Bowden wires 116 for actuation by an arm 99 of a bell crank 91, the Bowden wires 116 serving to operate, in well-known manner, a counting device, not shown, connected therewith. As the bell cranks 91 are to be grouped for operation, obviously there is no necessity to have a number of elements 115 equal to the number of bell cranks 91 and only one element 115 is required for each group of bell cranks 91. From the foregoing description it will be understood that the groups can be formed by splitting the column of bell cranks 91 in desired positions and, accordingly, the elements 115 must be adjustable lengthwise of the stack so that they can be located in position for operation by one of the bell cranks 91 of the group to which it is appropriate. The elements 115 are detachable and can be placed in any slot 114 in a bar 113 in which they are, after location, retained in position by a locking plate 118 which, as can be seen from Figure 6, can, under the operation of a hand lever 119, pivoted at 120 to the upright support 57, be moved vertically whereby, by the co-operation of slots 121 and pins 112, it moves outwards to release the elements 115. In the position shown in Figure 6, the plate 118 is retaining the elements 115 in position but, when the plate is depressed, the pins 122 are located in the upper positions of the slots 121 to release the elements 115 and so allow them to be removed and re-positioned in any other of the slots.

When an impulse is received by a Bowden wire 73 it is imparted to the pin 89 co-operating therewith so that, as indicated in Figure 9, the interponent 100 for operation thereby is moved against the action of its spring 103 to the position shown in Figure 9, the operating member 104 at this time being in the position shown in that figure. It will be clear from Figure 9 that when the operating member 104 is moved clockwise, by its cam 110, the interponent 100 will be engaged thereby so that the bell crank 91 connected thereto will be turned in a clockwise direction about the spindle 90. The angular movement of the bell crank will also be imparted to each of the other bell cranks, of which the one actuated forms one of a group, and accordingly that arm 99 of the group which is aligned with the Bowden wire 116 for that group will impart an impulse to impulse transmitting means formed by the Bowden wire 116 thus causing one unit to be added to the counter controlled by that group of bell cranks. The spring 103 acts to restore the active interponent 100 to its normal inactive position as shown in Figure 8.

From the foregoing description it will be understood that only one group of bell cranks 91 will be operated by the impulse generator 104 during a clockwise movement thereof because only one Bowden wire 73 is operated as the result of the sensing of any one record card and thus only one interponent 100 is positively moved to its active position, as shown in Figure 9. It will however be understood that the other interponents 100 which together with the actuated interponent from a group will be moved with their bell cranks when the active interponent 100 is engaged by the impulse generator 104 while in all other groups the interponents 100 remain inactive and the connecting members 91 therefor will not be moved by the action of the impulse generator at that time.

In the foregoing description, the impulse imparting elements 38 have been described as applied to an apparatus such that each impulse imparting element is representative of a number of from less than one to 143, but it will of course be readily understood that, if desired, the impulse imparting elements may be representative of numbers in the units and tens columns of a card when multiplied together. Thus with the device shown in the accompanying drawings in which the units and tens columns of a card each comprise twelve data-indicating positions, the impulse imparting elements may be arranged to give the results from multiplicands and multipliers between the ranges of one and twelve, there being 144 impulse imparting elements 38 provided in the devices.

I claim:

1. For providing impulses representative of data derived from the sensing of two columns of a statistical record card, a device operable under the control of statistical record cards, comprising a group of independently lengthwise movable toothed slides, a group of independently lengthwise movable selector slides, means to support the groups of slides in superposed relation for lengthwise sliding movement in directions normal one to the other, impulse imparting elements movable by the selector slides from inactive to active positions for lengthwise movement by teeth on the toothed slides, a column of actuators for each group of slides, one actuator being provided for each slide and the actuators of each column being appropriated one to each data-indicating position in a single column of a record card, and a reciprocable carriage for the toothed slides to move the toothed slides towards the impulse imparting elements thereby to effect lengthwise movement of active ones thereof.

2. A device according to claim 1, including for each slide a latch operable by an actuator appropriated thereto, and a spring urging the latch into latching engagement with the slide to retain it in an inactive position.

3. For providing impulses representative of data derived from the sensing of two columns of a statistical record card, a device operable under the control of statistical record cards, comprising a group of independently lengthwise movable toothed slides, a group of independently lengthwise movable selector slides, means to support the groups of slides in superposed relation for lengthwise sliding movement in directions normal one to the other, impulse imparting elements movable by the selector slides from inactive to active positions for lengthwise movement by teeth on the toothed slides, a pin extending laterally from each impulse imparting element and resting on an edge of a selector slide to provide a pivot for said element, guide elements extending laterally from said selector slides to guide the impulse imparting elements during lengthwise movement thereof, a column of actuators for each group of slides, one actuator being provided for each slide and the actuators of each column being appropriated one to each data-indicating position in a single column of a record card, and a reciprocable carriage for the toothed slides to move the toothed slides towards the impulse imparting elements thereby to effect lengthwise movement of active ones thereof.

4. For providing impulses representative of data derived from the sensing of two columns of a statistical record card, a device operable under the control of statistical record cards, comprising a group of independently lengthwise movable toothed slides, a group of independently lengthwise movable selector slides, means to support the groups of slides in superposed relation for lengthwise sliding movement in directions normal one to the other, impulse imparting elements movable by the selector slides from inactive to active positions for lengthwise movement by teeth on the toothed slides, a pin extending laterally from each impulse imparting element and resting on an edge of a selector slide to provide a pivot for said element, guide elements extending laterally from said selector slides to guide the impulse imparting elements during lengthwise movement thereof, a column of actuators for each group of slides, one actuator being provided for each slide and the actuators of each column being appropriated one to each data-indicating position in a single column of a record card, pairs of meshing toothed quadrants rockable about pivots supported by the carriage, pivoted links connected with the quadrants, eccentric straps connected with said links, and rotatable eccentric co-operating with said straps to effect reciprocation of the carriage.

5. For providing impulses representative of data derived from the sensing of two columns of a statistical record card, a device operable under the control of statistical record cards, comprising a group of independently lengthwise movable toothed slides, a group of independently lengthwise movable selector slides, means to support the groups of slides in superposed relation for lengthwise sliding movement in directions normal one to the other, impulse imparting elements movable by the selector slides from inactive to active positions for lengthwise movement by teeth on the toothed slides, a column of actuators for each group of slides, one actuator being provided for each slide and the actuators of each column being appropriated one to each data-indicating position in a single column of a record card, transmission means co-operating with each impulse imparting element to transmit an impulse therefrom, an impulse generator operable in timed relation with said carriage, interponents individual to each impulse imparting element and rendered active by an impulse transmitted thereto by said transmission means, a bell crank connected to each said interponent for angular movement thereby, said bell cranks being superposed for movement about an axis common thereto, connecting means connecting adjoining bell cranks to form a group thereof for simultaneous angular movement by said impulse generator through an active interponent, and impulse transmitting means for each said group operable by said impulse generator when any one of the interponents of a group is rendered active.

6. A device according to claim 5, including for each slide a latch operable by an actuator appropriated thereto, and a spring urging the latch into latching engagement with the slide to retain it in an inactive position.

7. For providing impulses representative of data derived from the sensing of two columns of a statistical record card, a device operable under the control of statistical record cards, comprising a group of independently lengthwise movable toothed slides, a group of independently lengthwise movable selector slides, means to support the groups of slides in superposed relation for lengthwise sliding movement in directions normal one to the other, impulse imparting elements movable by the selector slides from inactive to active positions for lengthwise movement by teeth on the toothed slides, a pin extending laterally from each impulse imparting element and resting on an edge of a selector slide to provide a pivot for said element, guide elements extending laterally from said selector slides to guide the impulse imparting elements during lengthwise movements thereof, a column of actuators for each group of slides, one actuator being provided for each slide and the actuators of each column being appropriated one to each data-indicating position in a single column of a record card, transmission means co-operating with each impulse imparting element to transmit an impulse therefrom, an impulse generator operable in timed relation with said carriage, interponents individual to each impulse imparting element and rendered active by an impulse transmitted thereto by said transmission means, a bell crank connected to each said interponent for angular movement thereby, said bell cranks being superposed for movement about an axis common thereto, connecting means connecting adjoining bell cranks to form a group thereof for simultaneous angular movement by said impulse generator through an active interponent, and impulse transmitting means for each said group operable by said impulse generator when any one of the interponents of a group is rendered active.

8. A device according to claim 5, wherein said connecting means include for each bell crank, a connecting member pivoted to one arm of the bell crank, a slot in the bell crank for engagement by a pin on the connecting member for the next adjoining bell crank, a latch pivoted to the bell crank to retain said connecting member with the pin thereon disengaged from the slot with which it cooperates, and a spring connecting said connecting member and latch and urging them in opposite directions.

9. A device according to claim 7, wherein said connecting means include for each bell crank, a connecting member pivoted to one arm of the bell crank, a slot in the bell crank for engagement by a pin on the connecting member for the next adjoining bell crank, a latch pivoted to the bell crank to retain said connecting member with the pin thereon disengaged from the slot with which it co-operates, and a spring connecting said connecting member and latch and urging them in opposite directions.

ARTHUR THOMAS.

No references cited.